US00RE46829E

(19) United States
(12) Reissued Patent
Lang et al.

(10) Patent Number: US RE46,829 E
(45) Date of Reissued Patent: May 8, 2018

(54) METHOD FOR SEPARATING HIGH MOLECULAR WEIGHT GASES FROM A COMBUSTION SOURCE

(71) Applicant: GAS SEPARATION TECHNOLOGIES, INC., Seattle, WA (US)

(72) Inventors: Jerry Lang, Lindale, TX (US); David Scott, Rockwall, TX (US)

(73) Assignee: GAS SEPARATION TECHNOLOGIES, INC., Seattle, WA (US)

(21) Appl. No.: 15/016,608

(22) Filed: Feb. 5, 2016

Related U.S. Patent Documents

Reissue of:
(64) Patent No.: 8,652,234
Issued: Feb. 18, 2014
Appl. No.: 14/086,049
Filed: Nov. 21, 2013

U.S. Applications:
(62) Division of application No. 13/314,110, filed on Dec. 7, 2011, now Pat. No. 8,657,919.
(Continued)

(51) Int. Cl.
*B01D 53/24* (2006.01)
*C01D 7/07* (2006.01)
*B01D 53/62* (2006.01)

(52) U.S. Cl.
CPC ..... *C01D 7/07* (2013.01); *B01D 53/24* (2013.01); *B01D 53/62* (2013.01);
(Continued)

(58) Field of Classification Search
CPC .. B01D 53/24; B01D 2251/304; B01D 53/62; B01D 2258/0283; B01D 2257/504; C01D 7/07; Y02P 20/152; Y02C 10/04
See application file for complete search history.

(56) References Cited

U.S. PATENT DOCUMENTS 3,199,269 A * 8/1965 Oehlrich et al. ..... 96/372
3,915,673 A 10/1975 Tamai et al.
(Continued)

FOREIGN PATENT DOCUMENTS

EP 0 540 743 A1 5/1993
EP 0540743 5/1993
(Continued)

OTHER PUBLICATIONS

PCT International Search Report and Written Opinion of PCT/US2011/063848, dated Jul. 2, 2012.
(Continued)

*Primary Examiner* — Krisanne Jastrzab
(74) *Attorney, Agent, or Firm* — Christopher A. Wiklof; Nicholas S. Bromer; Launchpad IP, Inc.

(57) ABSTRACT

High molecular weight (HMW) gases are separated from an exhaust gas of a combustion source using a blower and an interior vent within the exhaust stack. The interior vent includes a vent wall having a top portion attached to the interior surface of the exhaust stack along the entire inner perimeter of the exhaust stack and a lower portion that extends downward into the exhaust stack to form an annular space or gap between the vent wall and the interior surface of the exhaust stack, and at least one opening in the interior surface of the exhaust stack between the top and bottom portions of the vent wall. The blower creates a tangential flow of the exhaust gas with sufficient centrifugal force to concentrate substantially all of the HMW gases along the inner surface of the exhaust stack. A transfer pipe removes the HMW gases from the interior vent.

18 Claims, 4 Drawing Sheets

Related U.S. Application Data

(60) Provisional application No. 61/420,751, filed on Dec. 7, 2010.

(52) U.S. Cl.
CPC .. *B01D 2251/304* (2013.01); *B01D 2257/504* (2013.01); *B01D 2258/0283* (2013.01); *Y02C 10/04* (2013.01); *Y02P 20/152* (2015.11)

(56) References Cited

U.S. PATENT DOCUMENTS

| | | | | |
|---|---|---|---|---|
| 4,014,981 | A | 3/1977 | Wainer | |
| 4,557,912 | A | 12/1985 | Maguire | |
| 4,710,126 | A | 12/1987 | Areaux et al. | |
| 4,859,347 | A * | 8/1989 | Simon | B01D 17/0217 209/723 |
| 5,092,912 | A | 3/1992 | Korman | |
| 5,405,420 | A * | 4/1995 | Yang | 96/372 |
| 5,453,196 | A * | 9/1995 | Tuszko | B01D 45/12 209/715 |
| 5,491,976 | A | 2/1996 | Rock et al. | |
| 5,567,390 | A | 10/1996 | Cleary | |
| 5,964,985 | A | 10/1999 | Wootten | |
| 6,648,949 | B1 | 11/2003 | Der et al. | |
| 7,159,723 | B2 | 1/2007 | Hilpert et al. | |
| 7,857,889 | B2 | 12/2010 | Morf | |
| 8,357,232 | B1 | 1/2013 | Morrison | |
| 8,702,848 | B2 | 4/2014 | Kulprathipanja et al. | |
| 8,795,405 | B1 | 8/2014 | Aident et al. | |
| 9,108,148 | B2 | 8/2015 | Hassan et al. | |
| 2002/0068031 | A1 | 6/2002 | Confuorto et al. | |
| 2002/0189443 | A1 | 12/2002 | McGuire | |
| 2003/0221558 | A1 | 12/2003 | Lister et al. | |
| 2006/0037918 | A1 | 2/2006 | Spani | |
| 2008/0169576 | A1 | 7/2008 | Kojima | |
| 2009/0068090 | A1 | 3/2009 | Cherry | |
| 2009/0301296 | A1 | 12/2009 | Hoijtink et al. | |
| 2010/0037771 | A1 * | 2/2010 | Christensen | B01D 53/24 95/35 |
| 2010/0236242 | A1 | 9/2010 | Farsad et al. | |
| 2010/0313751 | A1 | 12/2010 | Hassan et al. | |
| 2011/0167866 | A1 | 7/2011 | Evans-Beauchamp | |
| 2012/0141352 | A1 | 6/2012 | Lang et al. | |
| 2012/0192714 | A1 | 8/2012 | Kulprathipanja et al. | |
| 2013/0025455 | A1 | 1/2013 | Morrison | |

FOREIGN PATENT DOCUMENTS

| | | |
|---|---|---|
| WO | 2012/078821 A2 | 6/2012 |
| WO | WO 2012/078821 | 6/2012 |

OTHER PUBLICATIONS

International Search Report for PCT/US2011/063848, published Sep. 20, 2012, 4 pages.
Written Opinion for PCT/US2011/063848, dated Jul. 2, 2012, 8 pages.

* cited by examiner

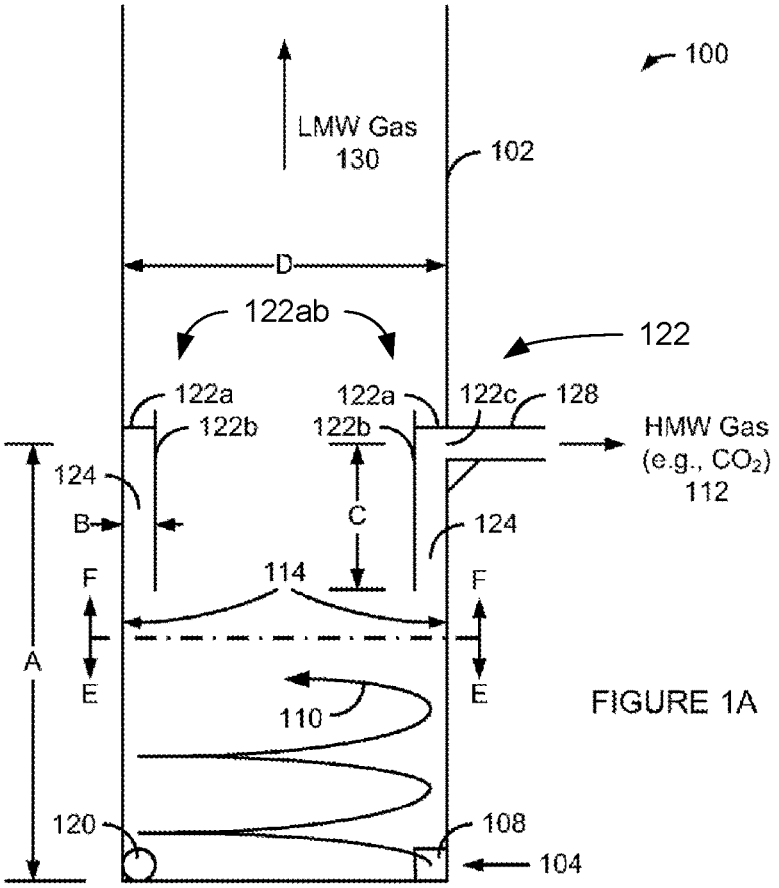
FIGURE 1A
Amended
CROSS SECTION E-E
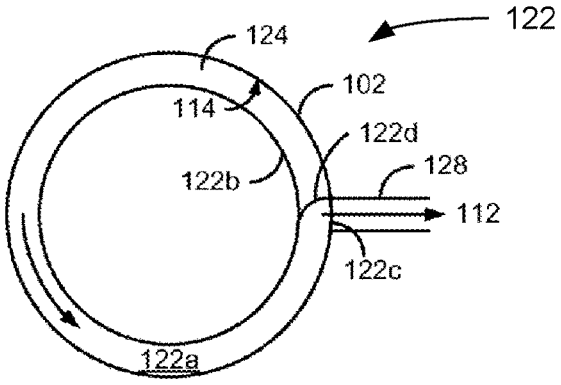
Amended
FIGURE 1C
CROSS SECTION F-F

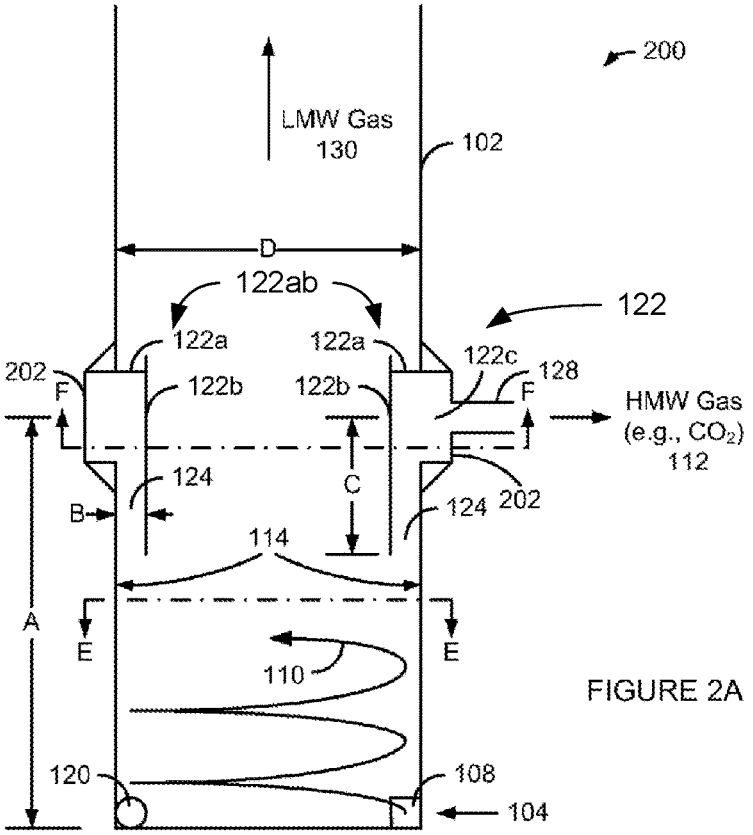
FIGURE 2A
Amended
CROSS SECTION E-E
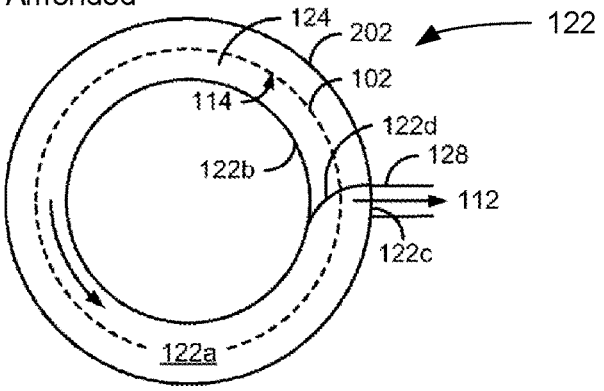
Amended
FIGURE 2C
CROSS SECTION F-F

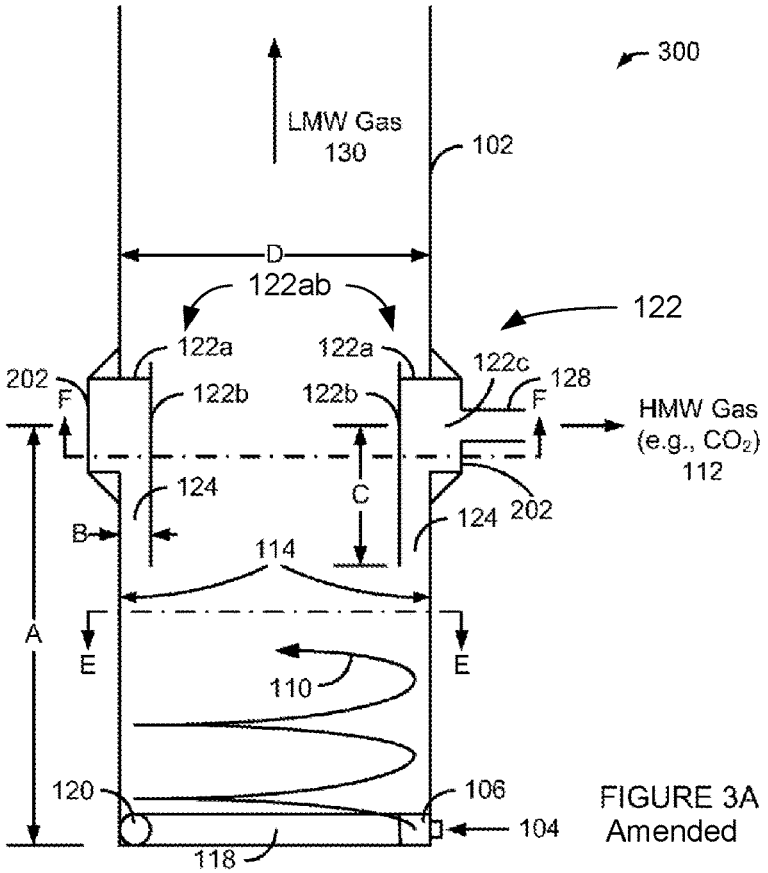
FIGURE 3A
Amended
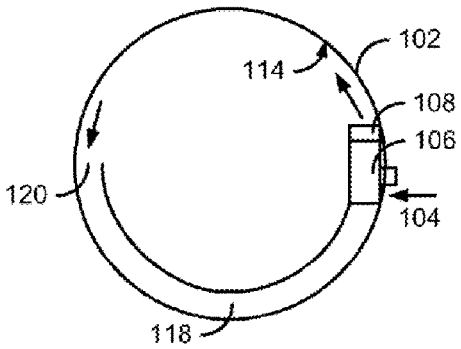
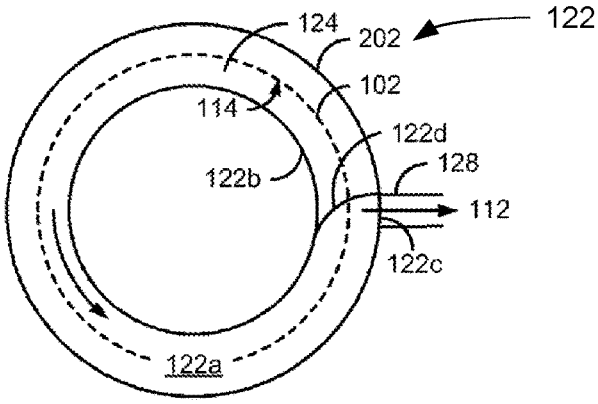
Amended
FIGURE 3B
CROSS SECTION E-E
FIGURE 3C
CROSS SECTION F-F

METHOD FOR SEPARATING HIGH MOLECULAR WEIGHT GASES FROM A COMBUSTION SOURCE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a divisional of U.S. patent application Ser. No. 13/314,110, filed Dec. 7, 2011, which claims priority to U.S. Provisional Application Ser. No. 61/420,751, filed Dec. 7, 2010, the entire contents of which are incorporated herein by reference.

FIELD OF THE INVENTION

The present invention relates generally to the field of separation and sequestration of combustion exhaust gases.

BACKGROUND OF THE INVENTION

Combustion systems have come under increased scrutiny for toxic emissions which are a by-product of the combustion process. Depending upon the extent of the combustion, carbon monoxide and $NO_X$ may be emitted at unacceptable levels. Carbon monoxide levels are normally controlled through complete combustion resulting in carbon dioxide. In fact, in years past, carbon dioxide was measured to determine the efficiency of the process. Traditionally, $NO_X$ and other VOC emissions have been either controlled by cleaner fuels or techniques that reduce formation. Recently, because of the push for alternative and renewable fuels, carbon dioxide being the only component here-to-fore not regulated has come under increased scrutiny (green house gases, carbon footprints and global warming).

The problem is, burning fossil fuels makes carbon dioxide, and burning fossil fuels more efficiently makes even more carbon dioxide. $NO_X$ and $SO_X$ along with other pollutants, which comprise only parts per million in the resulting emissions, are controlled by many effective methods; but there few effective methods of controlling $CO_2$ emissions.

Since $CO_2$ comprises from 10 to 15% of the exhaust or flue gas by volume, it is impractical to treat it without separating it from the remaining gases. Several systems have been developed to reduce the $CO_2$, and in some cases to concentrate the gas. Increasing the amount of hydrogen in the fuel will reduce the fraction of $CO_2$ in the flue gas, since hydrogen combustion does not produce $CO_2$. If the exhaust or flue gas is recirculated and the incoming fuel is mixed with pure $O_2$ the nitrogen in the air is eliminated. And, with enough recycling of the exhaust or flue gas, the $CO_2$ is concentrated to higher levels. After concentration, there are accepted methods of either using or treating the $CO_2$. The burning of the hydrogen simply reduces the $CO_2$. These known methods are quite inflexible and require reconfiguring the combustion equipment. In many cases, very flexible control algorithms will need to be employed to adjust the various fuel-air curves needed for the ever changing fuel compositions. The production or purchase of the hydrogen or oxygen needed in these processes also tend to make them impractical.

SUMMARY OF THE INVENTION

The present invention provides a system and method for separating high molecular weight gases, such as $CO_2$, from any combustion source. More specifically, the present invention imparts centrifugal force on the exhaust or flue gas by spinning the exhaust or flue gas with enough velocity to remove the heavy components, such as $CO_2$, to the outside diameter of the stack and removing it thru an annular space or gap formed by an interior vent. The spin needed for the centrifugal action may be imparted by using a blower to remove the gas tangentially from one side of the stack and blowing it tangentially back into the stack on the other side. The use of a stationary tubulator, or spin vanes, or actual in-stack centrifuge may be necessary in addition to the blower. Note that the velocity of the system may be varied to accommodate various fuels and flue gas mixtures. Moreover, the system may be fitted to stacks of virtually any size or flow. As a result, the present invention provides a simple process to take care of the hardest and most expensive step in controlling $CO_2$. Many treatment options are available after separation.

One embodiment of the present invention provides a method for separating high molecular weight gases from an exhaust gas of a combustion source by providing (a) a blower attached to an intake of an exhaust stack to receive the exhaust gas from the combustion source, (b) an interior vent within the exhaust stack comprising (i) a vent wall having a top portion attached to the interior surface of the exhaust stack along the entire inner perimeter of the exhaust stack and a lower portion that extends downward into the exhaust stack to form an annular space or gap between the vent wall and the interior surface of the exhaust stack, and (ii) at least one opening in the interior surface of the exhaust stack between the top and bottom portions of the vent wall, and (c) a transfer pipe connected to the at least one opening in the interior surface of the exhaust stack. A tangential flow of the exhaust gas is created within the exhaust stack using the blower, wherein the blower imparts sufficient centrifugal force on the exhaust gas to concentrate substantially all of the high molecular weight gases along the inner surface of the exhaust stack. The high molecular weight gases concentrated along the inner surface of the exhaust stack are collected using the interior vent. The high molecular weight gases are removed from the interior vent using the transfer pipe.

In addition, the present invention provides a system for separating high molecular weight gases in an exhaust stack from an exhaust gas of a combustion source using a blower, an interior vent and a transfer pipe. The blower is attached to an intake of the exhaust stack to receive the exhaust gas from the combustion source and create a tangential flow of the exhaust gas within the exhaust stack. The blower imparts sufficient centrifugal force on the exhaust gas to concentrate the high molecular weight gases along the inner surface of the exhaust stack. The interior vent is disposed within the exhaust stack and collects the high molecular weight gases concentrated along the inner surface of the exhaust stack. The interior vent includes (i) a vent wall having a top portion attached to the interior surface of the exhaust stack along the entire inner perimeter of the exhaust stack and a lower portion that extends downward into the exhaust stack to form an annular space or gap between the vent wall and the interior surface of the exhaust stack, and (ii) at least one opening in the interior surface of the exhaust stack between the top and bottom portions of the vent wall. The transfer pipe is connected to the at least one opening in the interior surface of the exhaust stack to remove the high molecular weight gases from the interior vent.

Moreover, the present invention provides a system for separating high molecular weight gases from an exhaust gas of a combustion source using an exhaust stack, a blower, an interior vent and a transfer pipe. The blower is attached to an intake of the exhaust stack to receive the exhaust gas from the combustion source and create a tangential flow of the exhaust gas within the exhaust stack. The blower imparts sufficient centrifugal force on the exhaust gas to concentrate the high molecular weight gases along the inner surface of the exhaust stack. The interior vent is disposed within the exhaust stack and collects the high molecular weight gases concentrated along the inner surface of the exhaust stack. The interior vent includes (i) a vent wall having a top portion attached to the interior surface of the exhaust stack along the entire inner perimeter of the exhaust stack and a lower portion that extends downward into the exhaust stack to form an annular space or gap between the vent wall and the interior surface of the exhaust stack, and (ii) at least one opening in the interior surface of the exhaust stack between the top and bottom portions of the vent wall. The transfer pipe is connected to the at least one opening in the interior surface of the exhaust stack to remove the high molecular weight gases from the interior vent. The high molecular weight gases have a molecular weight greater than 35 and at least 85% of the high molecular weight gases are concentrated along the inner surface of the exhaust stack. The annular space or gap has an area of approximately 10% of a cross-sectional area of the exhaust stack. The at least one opening is positioned at a height above the bottom of the exhaust stack approximately equal to three diameters of the exhaust stack. The blower causes the exhaust gases to spin around the exhaust stack at least five times within a height approximately equal to one diameter of the exhaust stack.

The present invention is described in detail below with reference to the accompanying drawings which are not to scale.

BRIEF DESCRIPTION OF THE DRAWINGS

The above and further advantages of the invention may be better understood by referring to the following description in conjunction with the accompanying drawings, in which:

FIGS. 1A, 1B and 1C are a cross sectional side view (FIG. 1A), a cross-sectional top view at cross section E-E (FIG. 1B), and a cross-sectional bottom view at cross section F-F (FIG. 1C) of a system for separating high molecular weight (HMW) gases in an exhaust stack in accordance with one embodiment of the present invention;

FIGS. 2A, 2B and 2C are a cross sectional side view (FIG. 2A), a cross-sectional top view at cross section E-E (FIG. 2B), and a cross-sectional bottom view at cross section F-F (FIG. 2C) of a system for separating high molecular weight (HMW) gases in an exhaust stack in accordance with another embodiment of the present invention;

FIGS. 3A, 3B and 3C are a cross sectional side view (FIG. 3A), a cross-sectional top view at cross section E-E (FIG. 3B), and a cross-sectional bottom view at cross section F-F (FIG. 3C) of a system for separating high molecular weight (HMW) gases in an exhaust stack in accordance with one embodiment of the present invention;

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

The present invention provides a system and method for separating high molecular weight gases, such as $CO_2$, from any combustion source. More specifically, the present invention imparts centrifugal force on the exhaust or flue gas by spinning the exhaust or flue gas with enough velocity to remove the heavy components, such as $CO_2$, to the outside diameter of the stack and removing it thru an annular space or gap formed by an interior vent. The spin needed for the centrifugal action may be imparted by using a blower to remove the gas tangentially from one side of the stack and blowing it tangentially back into the stack on the other side. The use of a stationary tubulator, or spin vanes, or actual in-stack centrifuge may be necessary in addition to the blower. Note that the velocity of the system may be varied to accommodate various fuels and flue gas mixtures. Moreover, the system may be fitted to stacks of virtually any size or flow. As a result, the present invention provides a simple process to take care of the hardest and most expensive step in controlling $CO_2$. Many treatment options are available after separation.

The typical constituent parts of exhaust or flue gas (used interchangeably) are as follows: the molecular weight of $CO_2$ is 44 and it comprises 10-15% of flue gases, the molecular weight of $N_2$ is 28 and it comprises approximately 78% of flue gases, the molecular weight of $O_2$ is 32 and it comprises approximately 3% of flue gases, the molecular weight of $H_2O$ is 18 and it comprises approximately 10-15% of flue gases, and the molecular weight of CO is 28 and it is normally a negligible percentage of the flue gas. These numbers indicate the $CO_2$ will need to be basically separated from the $N_2$ with a differential molecular weight of 16. After the $CO_2$ is separated from the flue gases, it can be compressed, injected into the ground, or used for other processes. In one embodiment of the present invention, the $CO_2$ is collected in a tank and then flowed up thru bubble trays containing sodium hydroxide which will cause the $CO_2$ to combine and produce sodium carbonate which can be collected for use otherwise. This embodiment is particularly useful in refineries and chemical plants where sodium hydroxide is commonly used in their processes (sometimes called "caustic soda"). After the sodium hydroxide is used, the plants use acid to reduce the used sodium hydroxide to a neutral PH so it can be disposed of. Using this byproduct does not require the purchase of gases and eliminates a disposal problem.

Figure 1B:
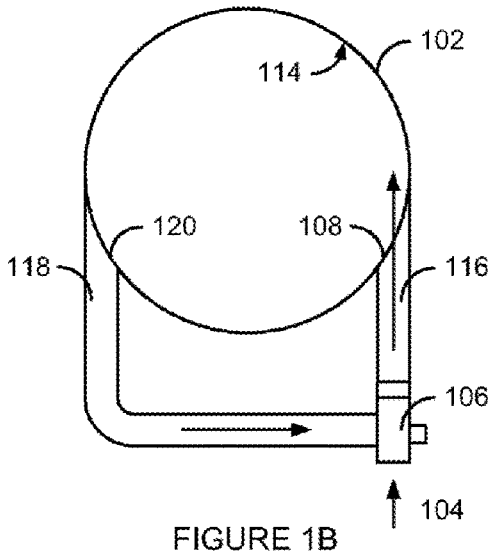

Now referring to FIGS. 1A, 1B and 1C, a cross sectional side view (FIG. 1A), a cross-sectional top view at cross section E-E (FIG. 1B), and a cross-sectional bottom view at cross section F-F (FIG. 1C) of a system 100 for separating high molecular weight (HMW) gases 112 in an exhaust stack 102 from an exhaust gas 104 of a combustion source in accordance with one embodiment of the present invention are shown. A blower 106 is attached to an intake 108 of the exhaust stack 102 to receive the exhaust gas 104 from the combustion source (502, FIG. 5) and create a tangential flow 110 of the exhaust gas 104 within the exhaust stack 102. The blower 106 imparts sufficient centrifugal force on the exhaust gas 104 to concentrate the high molecular weight gases 112, such as $CO_2$ or other gases having a higher molecular weight than $N_2$ or $O_2$ (e.g., greater than 35), along the inner perimeter or surface 114 of the exhaust stack 102. As used herein, "along the inner perimeter or surface of the exhaust stack" means an area within the exhaust stack 102 that is much closer to the inner surface 114 of the exhaust stack 102 than to the center of the exhaust stack 102. In other words, the high molecular weight gases 112 are concentrated near, towards or proximate to the inner surface 114 of the exhaust stack 102. The low molecular weight gases 130 exit through the top of the exhaust stack 102.

Typically, the blower 106 causes the exhaust gases 104 to spin around the interior of the exhaust stack 102 at least five times within a height approximately equal to one diameter (D) of the exhaust stack 102. As shown, the blower 106 is external to the exhaust stack 102 and is connected to the intake 108 of the exhaust stack 102 with a first pipe 116. A second pipe 118 connects the blower 106 to the bottom of the exhaust stack 102 at a point 120 approximately opposite to the intake 108 and in line with the tangential flow 110 in order to create the sufficient centrifugal force on the exhaust gas 104. The use of a stationary tubulator, or spin vanes, or actual in-stack centrifuge may be necessary in addition to the blower 106.

An interior vent 122 within the exhaust stack 102 collects the high molecular weight gases 112 concentrated along the inner surface 114 of the exhaust stack 102. The interior vent 122 includes: (i) a vent wall *122ab* having a top portion 122a attached to the interior surface 114 of the exhaust stack 102 along the entire inner perimeter of the exhaust stack 102 (e.g., the top portion 122a is attached to the inner surface 114 along any side cross section of the exhaust stack 102) and a lower portion 122b that extends downward into the exhaust stack 102 to form an annular space or gap 124 between the vent wall [122] *lower portion 122b* and the interior surface 114 of the exhaust stack 102; and (ii) at least one opening 122c in the interior surface 114 of the exhaust stack 102 between the top 122a and [bottom] *lower* 122b portions of the vent wall [122] *122ab*. A transfer pipe 128 is connected to the at least one opening 122c in the interior surface 114 of the exhaust stack 102 to remove the high molecular weight gases 112 from the interior vent 122. The at least one or more openings 122c can be holes, slots, or any other geometrically shaped passageway. Moreover, more than one transfer pipe 128 can be used. The lower portion 122b of the vent wall [122] *122ab* can be substantially parallel to the interior surface 114 of the exhaust stack 102, curved or angled with respect to the interior surface 114 of the exhaust stack 102. Note that the top portion 122a of the interior vent 122 does not have to be aligned with a horizontal plane of the exhaust stack 102. For example, the top portion 122a can be angled from the horizontal plane in accordance with the tangential flow 110 (top portion 122a on the opposite side of the exhaust stack 102 from the opening 122c positioned lower than the top portion 122a adjacent to the opening 122c). For example, the top portion 122a can form one or more spirals down from the one or more openings 122c. In addition, an optional baffle or guide 122d proximate to the at least one opening 122c can be used to direct the flow of the high molecular weight gases 112 from the interior vent 122 into the transfer pipe 128. The baffle or guide 122d can be straight, angled, curved or any other shape and orientation to more efficiently guide the high molecular weight gases 112 into the transfer pipe 128.

The dimensions (A, B, C, D) of the vent wall [122] *122ab* will vary in accordance with the design specifications for the system 100. The design specification may take into account one or more parameters, such as temperature, humidity, velocity, gas composition, fuel type, or exhaust gas mixture. The system 100 dimensions should be configured to concentrate and capture at least 85% of the high molecular weight gases. The at least one opening 122c is positioned at a height (A) such that the high molecular weight gases 112 have spun around the exhaust stack 102 approximately fifteen to twenty times or more. In one example, the at least one opening 122c is positioned at a height (A) above the bottom of the exhaust stack 102 approximately equal to three diameters (3×D) of the exhaust stack 102, the annular space or gap 124 has an area (B) of approximately 10% of a cross-sectional area of the exhaust stack 102, and the [bottom] *lower* portion [122a] *122b* of the vent wall [122] *122ab* extends down a distance (C) approximately equal to one half diameter (0.5×D) of the exhaust stack 102.

The system 100 may also include other components, such as a tank (504, FIG. 5) connected to the transfer pipe 128 to store the removed high molecular weight gases 112, a compressor attached to the transfer pipe 128 to compress the removed high molecular weight gases 112 (506, FIG. 5), a motor (*not shown*) attached to the vent wall [122] *122ab* that adjusts a size of the annular space or gap 124 based on one or more parameters (e.g., temperature, humidity, velocity, gas composition, fuel type, or exhaust gas mixture, etc.), and/or one or more sensors (*not shown*) attached to the blower 106, exhaust stack 102, interior vent 122 or transfer pipe 128. A controller (*not shown*) can be communicably coupled to the motor (*not shown*) and the one or more sensors to adjust the size (B) of the annular space or gap 124 using the motor based on one or more parameters detected by the one or more sensors. As previously discussed, one or more bubble trays (508, FIG. 5) containing sodium hydroxide can be attached to the transfer pipe 128 or tank such that the removed $CO_2$ is combined with the sodium hydroxide to produce sodium carbonate.

Figure 2B:
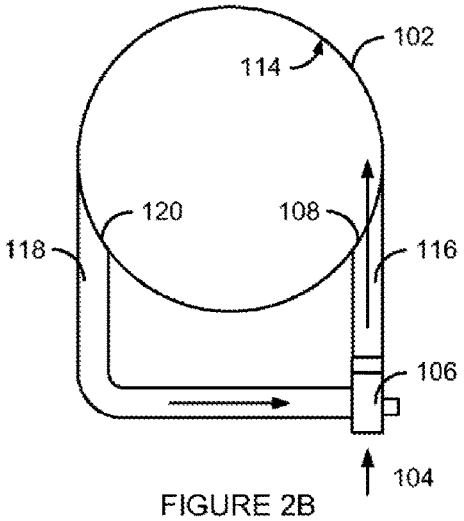

Referring now to FIGS. 2A, 2B and 2C, a cross-sectional side view (FIG. 2A), a cross-sectional top view at cross section E-E (FIG. 2B) and a cross-sectional bottom view at cross section F-F (FIG. 2C) of the system 200 for separating high molecular weight (HMW) gases 112 in an exhaust stack 102 from an exhaust gas 104 of a combustion source in accordance with one embodiment of the present invention are shown. A blower 106 is attached to an intake 108 of the exhaust stack 102 to receive the exhaust gas 104 from the combustion source (502, FIG. 5) and create a tangential flow 110 of the exhaust gas 104 within the exhaust stack 102. The blower 106 imparts sufficient centrifugal force on the exhaust gas 104 to concentrate the high molecular weight gases 112, such as $CO_2$ or other gases having a higher molecular weight greater than $N_2$ or $O_2$ (e.g., greater than 35), along the inner perimeter or surface 114 of the exhaust stack 102. Typically, the blower 106 causes the exhaust gases 104 to spin around the interior of the exhaust stack 102 at least five times within a height approximately equal to one diameter (D) of the exhaust stack 102.

As shown, the blower 106 is external to the exhaust stack 102 and is connected to the intake 108 of the exhaust stack 102 with a first pipe 116. A second pipe 118 connects the blower 106 to the bottom of the exhaust stack 102 at a point 120 approximately opposite to the intake 108 and in line with the tangential flow 110 in order to create the sufficient centrifugal force on the exhaust gas 104. The use of a stationary tubulator, or spin vanes, or actual in-stack centrifuge may be necessary in addition to the blower 106.

An interior vent 122 within the exhaust stack 102 collects the high molecular weight gases 112 concentrated along the inner surface 114 of the exhaust stack 102. The interior vent 122 includes: (i) a vent wall *122ab* having a top portion 122a attached to the interior surface 114 of the exhaust stack 102 along the entire inner perimeter of the exhaust stack 102 (e.g., the top portion 122a is attached to the inner surface 114 along any side cross section of the exhaust stack 102) and a lower portion 122b that extends downward into the exhaust stack 102 to form an annular space or gap 124 between the vent wall [122] *122ab* and the interior surface 114 of the exhaust stack 102; (ii) at least one opening 122c in the interior surface 114 of the exhaust stack 102 between the top 122a and [bottom] *lower* 122b portions of the vent wall [122] *122ab*; and (iii) a bustle 202 attached to or integrated into the exhaust stack 102 between the at least one opening 122c in the inner surface 114 of the exhaust stack 102 and a transfer pipe 128. The transfer pipe 128 is connected to bustle 202 to remove the high molecular weight gases 112 from the interior vent [122] *122ab*. The at least one or more openings 122c can be holes, slots, or any other geometrically shaped passageway. Moreover, more than one transfer pipe 128 can be used. The lower portion 122b of the vent wall [122] *122ab* can be substantially parallel to the interior surface 114 of the exhaust stack 102, curved or angled with respect to the interior surface 114 of the exhaust stack 102. Note that the top portion 122a of the interior vent [122] *122ab* does not have to be aligned with a horizontal plane of the exhaust stack 102. For example, the top portion 122a can be angled from the horizontal plane in accordance with the tangential flow 110 (top portion 122a on the opposite side of the exhaust stack 102 from the opening 122c positioned lower than the top portion 122a adjacent to the opening 122c). For example, the top portion 122a can form one or more spirals down from the one or more openings 122c. In addition, an optional baffle or guide 122d proximate to the at least one opening 122c can be used to direct the flow of the high molecular weight gases 112 from the interior vent 122 into the transfer pipe 128. The baffle or guide 122d can be straight, angled, curved or any other shape and orientation to more efficiently guide the high molecular weight gases 112 into the transfer pipe 128.

The dimensions (A, B, C, D) of the vent wall [122] *122ab* will vary in accordance with the design specifications for the system 200. The design specification may take into account one or more parameters, such as temperature, humidity, velocity, gas composition, fuel type, or exhaust gas mixture. The system 200 dimensions should be configured to concentrate and capture at least 85% of the high molecular weight gases. The at least one opening 122c is positioned at a height (A) such that the high molecular weight gases 112 have spun around the exhaust stack 102 approximately fifteen to twenty times or more. In one example, the at least one opening 122c is positioned at a height (A) above the bottom of the exhaust stack 102 approximately equal to three diameters (3×D) of the exhaust stack 102, the annular space or gap 124 has an area (B) of approximately 10% of a cross-sectional area of the exhaust stack 102, and the [bottom] *lower* portion [122a] *122b* of the vent wall [122] *122ab* extends down a distance (C) approximately equal to one half diameter (0.5×D) of the exhaust stack 102.

The system 100 may also include other components, such as a tank (504, FIG. 5) connected to the transfer pipe 128 to store the removed high molecular weight gases 112, a compressor attached to the transfer pipe 128 to compress the removed high molecular weight gases 112 (506, FIG. 5), a motor (*not shown*) attached to the vent wall [122] *122ab* that adjusts a size of the annular space or gap 124 based on one or more parameters (e.g., temperature, humidity, velocity, gas composition, fuel type, or exhaust gas mixture, etc.), and/or one or more sensors (*not shown*) attached to the blower 106, exhaust stack 102, interior vent 122 or transfer pipe 128. A controller (*not shown*) can be communicably coupled to the motor and the one or more sensors to adjust the size (B) of the annular space or gap 124 using the motor based on one or more parameters detected by the one or more sensors. As previously discussed, one or more bubble trays (508, FIG. 5) containing sodium hydroxide can be attached to the transfer pipe 128 or tank such that the removed $CO_2$ is combined with the sodium hydroxide to produce sodium carbonate.

Now referring to FIGS. 3A, 3B and 3C, a cross sectional side view (FIG. 3A), a cross-sectional top view at cross section E-E (FIG. 3B) and a cross-sectional bottom view at cross section F-F (FIG. 3C) of the system 300 for separating high molecular weight (HMW) gases in an exhaust stack 102 from an exhaust gas 104 of a combustion source in accordance with one embodiment of the present invention are shown. A blower 106 is attached to an intake 108 of the exhaust stack 102 to receive the exhaust gas 104 from the combustion source (502, FIG. 5) and create a tangential flow 110 of the exhaust gas 104 within the exhaust stack 102. The blower 106 imparts sufficient centrifugal force on the exhaust gas 104 to concentrate the high molecular weight gases 112, such as $CO_2$ or other gases having a higher molecular weight greater than $N_2$ or $O_2$ (e.g., greater than 35), along the inner perimeter or surface 114 of the exhaust stack 102. Typically, the blower 106 causes the exhaust gases 104 to spin around the interior of the exhaust stack 102 at least five times within a height approximately equal to one diameter (D) of the exhaust stack 102. As shown, the blower 106 is internal to the exhaust stack 102. A second pipe 118 or channel connects the blower 106 to the bottom of the exhaust stack 102 at a point 120 approximately opposite to the intake 108 and in line with the tangential flow 110 in order to create the sufficient centrifugal force on the exhaust gas 104. The use of a stationary tubulator, or spin vanes, or actual in-stack centrifuge may be necessary in addition to the blower 106.

An interior vent 122 within the exhaust stack 102 collects the high molecular weight gases 112 concentrated along the inner surface 114 of the exhaust stack 102. The interior vent 122 includes: (i) a vent wall *122ab* having a top portion 122a attached to the interior surface 114 of the exhaust stack 102 along the entire inner perimeter of the exhaust stack 102 (e.g., the top portion 122a is attached to the inner surface 114 along any side cross section of the exhaust stack 102) and a lower portion 122b that extends downward into the exhaust stack 102 to form an annular space or gap 124 between the vent wall [122] *122ab* and the interior surface 114 of the exhaust stack 102; (ii) at least one opening 122c in the interior surface 114 of the exhaust stack 102 between the top 122a and [bottom] *lower* 122b portions of the vent wall [122] *122ab*; and (iii) a bustle 202 attached to or integrated into the exhaust stack 102 between the at least one opening 122c in the inner surface 114 of the exhaust stack 102 and a transfer pipe 128. The transfer pipe 128 is connected to bustle 202 to remove the high molecular weight gases 112 from the interior vent 122. The at least one or more openings 122c can be holes, slots, or any other geometrically shaped passageway. Moreover, more than one transfer pipe 128 can be used. The lower portion 122b of the vent wall [122] *122ab* can be substantially parallel to the interior surface 114 of the exhaust stack 102, curved or angled with respect to the interior surface 114 of the exhaust stack 102. Note that the top portion 122a of the interior vent 122 does not have to be aligned with a horizontal plane of the exhaust stack 102. For example, the top portion 122a can be angled from the horizontal plane in accordance with the tangential flow 110 (top portion 122a on the opposite side of the exhaust stack 102 from the opening 122c positioned lower than the top portion 122a adjacent to the opening 122c). For example, the top portion 122a can form one or more spirals down from the one or more openings 122c. In addition, an optional baffle or guide 122d proximate to the at least one opening 122c can be used to direct the flow of the high molecular weight gases 112 from the interior vent 122 into the transfer pipe 128. The baffle or guide 122d can be straight, angled, curved or any other shape and orientation to more efficiently guide the high molecular weight gases 112 into the transfer pipe 128).

The dimensions (A, B, C, D) of the vent wall [122] *122ab* will vary in accordance with the design specifications for the system 300. The design specification may take into account one or more parameters, such as temperature, humidity, velocity, gas composition, fuel type, or exhaust gas mixture. The system 300 dimensions should be configured to concentrate and capture at least 85% of the high molecular weight gases. The at least one opening 122c is positioned at a height (A) such that the high molecular weight gases 112 have spun around the exhaust stack 102 approximately fifteen to twenty times or more. In one example, the at least one opening 122c is positioned at a height (A) above the bottom of the exhaust stack 102 approximately equal to three diameters (3×D) of the exhaust stack 102, the annular space or gap 124 has an area (B) of approximately 10% of a cross-sectional area of the exhaust stack 102, and the [bottom] *lower* portion [122a] *122b* of the vent wall [122] *122ab* extends down a distance (C) approximately equal to one half diameter (0.5×D) of the exhaust stack 102.

The system 100 may also include other components, such as a tank (504, FIG. 5) connected to the transfer pipe 128 to store the removed high molecular weight gases 112, a compressor attached to the transfer pipe 128 to compress the removed high molecular weight gases 112 (506, FIG. 5), a motor (*not shown*) attached to the vent wall [122] *122ab* that adjusts a size of the annular space or gap 124 based on one or more parameters (e.g., temperature, humidity, velocity, gas composition, fuel type, or exhaust gas mixture, etc.), and/or one or more sensors (*not shown*) attached to the blower 106, exhaust stack 102, interior vent 122 or transfer pipe 128. A controller (*not shown*) can be communicably coupled to the motor and the one or more sensors to adjust the size (B) of the annular space or gap 124 using the motor based on one or more parameters detected by the one or more sensors. As previously discussed, one or more bubble trays (508, FIG. 5) containing sodium hydroxide can be attached to the transfer pipe 128 or tank such that the removed $CO_2$ is combined with the sodium hydroxide to produce sodium carbonate.

Figure 4:
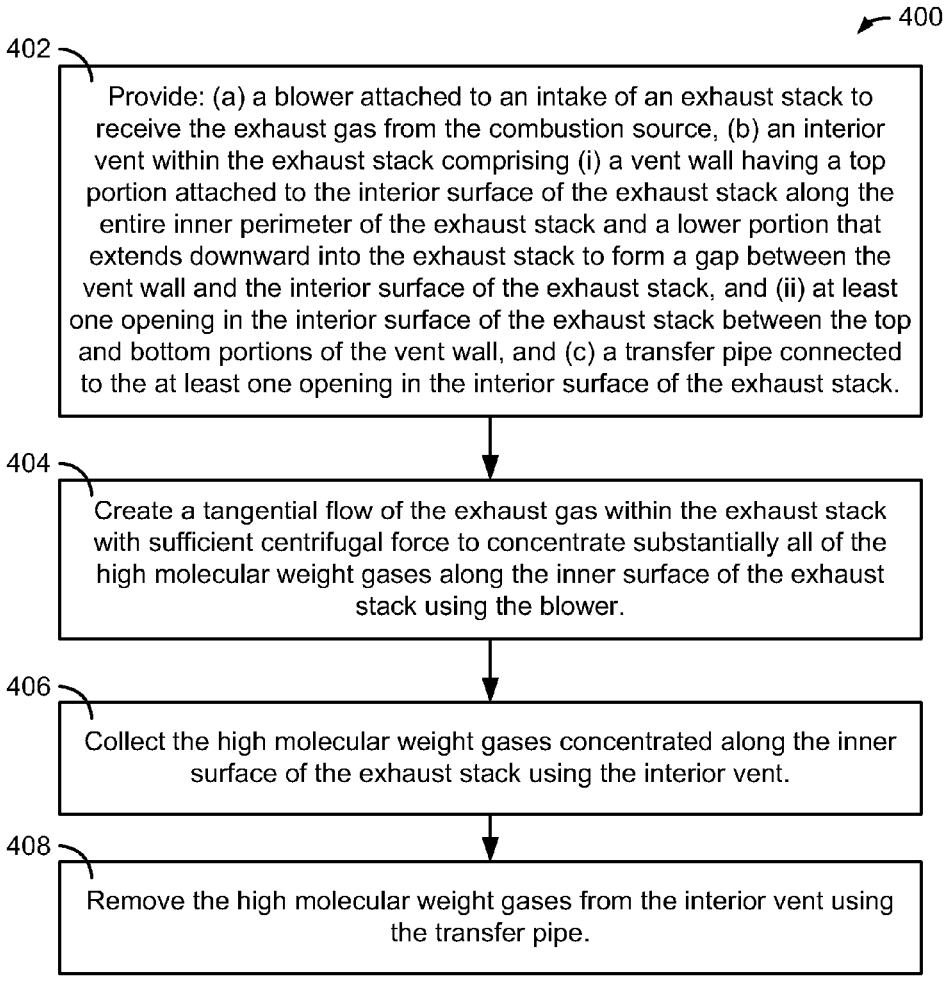
FIG. 4 is a flow chart of a method for separating high molecular weight (HMW) gases from an exhaust gas in accordance with one embodiment of the present invention.

Referring now to FIG. 4, a flow chart of a method 400 for separating high molecular weight gases in an exhaust stack from an exhaust gas of a combustion source in accordance with one embodiment of the present invention is shown. The following components are provided in block 402 to perform the method 400: (a) a blower attached to an intake of an exhaust stack to receive the exhaust gas from the combustion source, (b) an interior vent within the exhaust stack comprising (i) a vent wall having a top portion attached to the interior surface of the exhaust stack along the entire inner perimeter of the exhaust stack and a lower portion that extends downward into the exhaust stack to form an annular space or gap between the vent wall and the interior surface of the exhaust stack, and (ii) at least one opening in the interior surface of the exhaust stack between the top and bottom portions of the vent wall, and (c) a transfer pipe connected to the at least one opening in the interior surface of the exhaust stack. A tangential flow of the exhaust gas within the exhaust stack is created using the blower in block 404. The blower imparts sufficient centrifugal force on the exhaust gas to concentrate substantially all of the high molecular weight gases along the inner surface of the exhaust stack. The high molecular weight gases concentrated along the inner surface of the exhaust stack are collected using the interior vent in block 406. The high molecular weight gases are removed from the interior vent using the transfer pipe in block 408.

Additional steps may include storing the removed high molecular weight gases in a tank (504, FIG. 5) connected to the transfer pipe, compressing the removed high molecular weight gases (506, FIG. 5), injecting the removed high molecular weight gases into a below-ground storage, or flowing the removed $CO_2$ up through one or more bubble trays containing sodium hydroxide which causes the removed $CO_2$ to combine with the sodium hydroxide to produce sodium carbonate (508, FIG. 5).

Figure 5:
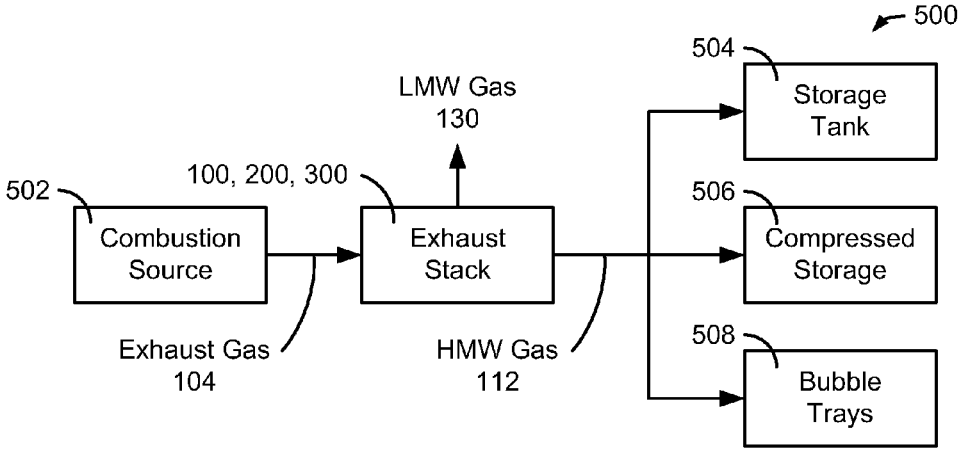
FIG. 5 is a block diagram of a system incorporating the embodiments of the present invention.

Now referring to FIG. 5, a block diagram of a system 500 incorporating the embodiments of the present invention is shown. As previously described, the combustion source 502 creates exhaust 104, which is transported to the exhaust stack *102* (*not specifically illustrated in FIG. 5*) *of system* 100, 200 or 300. Low molecular gas 130 exits the exhaust stack [100, 200 or 300]. The high molecular weight gas 112 is collected and removed from the exhaust stack [100, 200 or 300] for further processing (e.g., storage in a tank 504, compression followed by storage 506, bubble trays to produce sodium carbonate 508, etc.). The high molecular weight gas 112 can be used in other ways as will be appreciated and known by those skilled in the art.

The various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present invention have been described in detail, it will be understood by those skilled in the art that various modifications can be made therein without departing from the spirit and scope of the invention as set forth in the appended claims.

What is claimed is:

1. A method for separating high molecular weight gases from an exhaust gas of a combustion source comprising the steps of:

providing (a) a blower attached to an intake of an exhaust stack to receive the exhaust gas from the combustion source, (b) an interior vent within the exhaust stack comprising (i) a vent wall having a top portion attached to [the] *an* interior surface of the exhaust stack along the entire inner perimeter of the exhaust stack and a lower portion that extends downward into the exhaust stack to form a gap between the vent wall and the interior surface of the exhaust stack, and (ii) at least one opening in the interior surface of the exhaust stack between the top and bottom portions of the vent wall, and (c) a transfer pipe connected to the at least one opening in the interior surface of the exhaust stack;

*concentrating the high molecular weight gases along the inner surface of the exhaust stack by* creating a tangential flow of the exhaust gas within the exhaust stack using the blower[, wherein the blower imparts sufficient centrifugal force on the exhaust gas to concentrate substantially all of the high molecular weight gases along the inner surface of the exhaust stack];

collecting the high molecular weight gases concentrated along the inner surface of the exhaust stack using the interior vent; and removing the high molecular weight gases from the interior vent using the transfer pipe.

2. The method as recited in claim 1, further comprising the steps of:

storing the removed high molecular weight gases in a tank connected to the transfer pipe;

compressing the removed high molecular weight gases; or injecting the removed high molecular weight gases into a below-ground storage.

3. The method as recited in claim 1, wherein the high molecular weight gases have a molecular weight greater than 35.

4. The method as recited in claim 1, wherein the high molecular weight gases comprise $CO_2$.

5. The method as recited in claim 4, further comprising the step of flowing the removed $CO_2$ up through one or more bubble trays containing sodium hydroxide [which causes the removed $CO_2$ to combine with the sodium hydroxide to produce sodium carbonate].

[6. The method as recited in claim 1, wherein;

the sufficient centrifugal force is provided by the blower in combination with a stationary tabulator, spin vanes, or in-stack centrifuge; and the blower is located inside or outside of the exhaust stack.]

7. The method as recited in claim 1, further comprising *providing* a bustle attached to or integrated into the exhaust stack between the at least one opening in the inner surface of the exhaust stack and the transfer pipe.

8. The method as recited in claim 1, wherein the *lower portion of the* vent wall is substantially parallel to the interior surface of the exhaust stack, curved, or [is] angled with respect to the interior surface of the exhaust stack.

9. The method as recited in claim 1, wherein *the concentrating the high molecular weight gases along the inner surface of the exhaust stack comprises concentrating* at least 85% of the high molecular weight gases [are concentrated] along the inner surface of the exhaust stack.

10. The method as recited in claim 1, wherein the gap comprises an area of approximately 10% of a cross-sectional area of the exhaust stack.

11. The method as recited in claim 1, wherein the at least one opening is positioned such that the high molecular weight gases have spun around the exhaust stack approximately fifteen to twenty times *prior to reaching the at least one opening*.

12. The method as recited in claim 1, wherein the blower causes the exhaust gases to spin around the exhaust stack at least five times within a height approximately equal to one diameter of the exhaust stack.

13. The method as recited in claim 1, wherein the at least one opening is positioned at a height above [the] *a* bottom of the exhaust stack approximately equal to three diameters of the exhaust stack.

14. The method as recited in claim 1, wherein the [bottom] *lower* portion of the vent wall extends down to a height above [the] *a* bottom of the exhaust stack approximately equal to one half diameter of the exhaust stack.

15. The method as recited in claim 1, further comprising [a motor attached to] *moving* the vent wall [that adjusts] *to adjust* a size of the gap.

16. The method as recited in claim 15, wherein the [motor] *step of moving* is used to adjust the size of the gap based on one or more parameters comprising temperature, humidity, velocity, gas composition, fuel type, or exhaust gas mixture.

[17. The method as recited in claim 15, further comprising:

one or more sensors attached to the blower, exhaust stack, interior vent or transfer pipe; and a controller communicably coupled to the motor and the one or more sensors, wherein the controller to adjusts the size of the gap using the motor based on one or more parameters detected by the one or more sensors.]

*18. The method as recited in claim 9, wherein concentrating the high molecular weight gases along the inner surface of the exhaust stack comprises concentrating substantially all of the high molecular weight gases along the inner surface of the exhaust stack.*

*19. The method as recited in claim 16, further comprising:*

*sensing the one or more parameters of the exhaust gas at the blower, exhaust stack, interior vent, or transfer pipe; and*

*controlling the step of moving the vent wall to adjust the size of the gap based on the sensed one or more parameters.*

*20. A method for removing high molecular weight gases from an exhaust stream, comprising:*

*introducing exhaust gas tangentially into an exhaust stack;*

*concentrating high molecular weight gases toward an inner surface of the exhaust stack by spinning the exhaust gas and imparting centrifugal force; and*

*removing gases from along the inner surface of the exhaust stack;*

*wherein the spinning the exhaust gas and imparting centrifugal force comprises accelerating exhaust gas that is spinning within the stack; and*

*wherein the accelerating exhaust gas comprises removing exhaust gas tangentially from one side of the exhaust*

*stack and blowing it tangentially back into the exhaust stack on a side opposite the one side.*

* * * * *